(12) United States Patent
DeMonte et al.

(10) Patent No.: US 8,479,439 B2
(45) Date of Patent: Jul. 9, 2013

(54) SELF-CONTAINED HEATING UNIT FOR THERMAL PEST CONTROL

(75) Inventors: Todd R. DeMonte, Cottage Grove, WI (US); Keith Teakell, Jenks, OK (US); Eric P. Camenga, Milton, WI (US); Michael J. Steffes, Stoughton, WI (US)

(73) Assignee: Technologies Holding Corp., Houston, TX (US)

( * ) Notice: Subject to any disclaimer, the term of this patent is extended or adjusted under 35 U.S.C. 154(b) by 0 days.

(21) Appl. No.: 13/080,970

(22) Filed: Apr. 6, 2011

(65) Prior Publication Data

US 2012/0255219 A1    Oct. 11, 2012

(51) Int. Cl.
*A01M 1/20* (2006.01)
*A01M 17/00* (2006.01)
*A01M 19/00* (2006.01)

(52) U.S. Cl.
USPC ....... 43/132.1; 43/124; 126/99 R; 126/110 R; 126/110 B; 126/110 C; 126/110 D; 126/116 R; 126/116 A; 126/112; 431/22; 432/49; 432/219; 432/222

(58) Field of Classification Search
USPC ....... 43/124, 132.1, 125, 129, 144; 126/99 R, 126/110 A, 110 AA, 110 B, 110 R, 110 C, 126/110 D, 116 R, 116 A, 112, 512, 271.1, 126/271.2 R, 271.2 A, 271.2 B, 271.2 C; 431/22; 432/222, 223, 49, 219
See application file for complete search history.

(56) References Cited

U.S. PATENT DOCUMENTS

| | | | | | |
|---|---|---|---|---|---|
| 139,562 | A | * | 6/1873 | Fewell | 43/130 |
| 919,827 | A | * | 4/1909 | Cochrane et al. | 43/144 |
| 1,346,587 | A | * | 7/1920 | Bernstein | 126/116 R |
| 2,051,057 | A | * | 8/1936 | Pettit | 43/124 |
| 2,059,835 | A | * | 11/1936 | Worthing et al. | 43/132.1 |
| 2,144,626 | A | * | 1/1939 | Hewitt | 126/110 B |
| 2,365,092 | A | * | 12/1944 | Martin | 126/116 A |
| 2,454,296 | A | * | 11/1948 | Woods | 432/49 |

(Continued)

FOREIGN PATENT DOCUMENTS

CA    2205673        11/1998
DE    4025828 A1 *  2/1992

(Continued)

OTHER PUBLICATIONS

De Monte et al., U.S. Appl. No. 13/007,021, filed Jan. 14, 2011, "Hydronic Heating System and Method for Pest Control".

(Continued)

*Primary Examiner* — Darren W Ark
(74) *Attorney, Agent, or Firm* — Baker Botts L.L.P.

(57) ABSTRACT

In certain embodiments, an apparatus for killing pests in an affected area includes a fuel source, a first air inlet configured to receive a first air flow from the affected area, and a second air inlet configured to receive a second air flow from an unaffected area. The system further includes a premix system operable to generate an air-fuel mixture by mixing a fuel flow received from the fuel source with the second air flow received from the second air inlet. The system further includes a burner operable to generate combustion air by combusting the air-fuel mixture. The combustion air is mixed with the first air flow subsequent to combustion to generate a heated air flow, and the heated air flow is discharged into the affected area. The fuel source, the premix system, and the burner are configured for positioning in the affected area.

11 Claims, 3 Drawing Sheets

U.S. PATENT DOCUMENTS

| | | | |
|---|---|---|---|
| 2,469,963 A * | 5/1949 | Grosjean et al. | 43/124 |
| 2,606,014 A * | 8/1952 | Baumann | 432/222 |
| 2,780,218 A * | 2/1957 | Allen | 432/223 |
| 2,810,060 A * | 10/1957 | Tullis et al. | 126/110 R |
| 2,985,438 A * | 5/1961 | Prowler | 432/223 |
| 2,990,117 A * | 6/1961 | Robson | 126/110 R |
| 3,036,382 A * | 5/1962 | Shotton, Jr. | 126/110 B |
| 3,050,111 A * | 8/1962 | Hubbard et al. | 432/222 |
| 3,051,464 A * | 8/1962 | Yeo et al. | 432/222 |
| 3,109,637 A * | 11/1963 | Taylor | 432/223 |
| 3,114,538 A * | 12/1963 | Kennedy | 432/222 |
| RE25,626 E * | 7/1964 | Yeo et al. | 432/222 |
| 3,401,920 A * | 9/1968 | Berkhoudt et al. | 432/223 |
| 3,494,599 A * | 2/1970 | Jones et al. | 432/223 |
| 3,537,803 A * | 11/1970 | Ignazio | 431/22 |
| 3,608,505 A * | 9/1971 | Rosenberg et al. | 432/223 |
| 3,630,499 A * | 12/1971 | Kramer, Jr. | 432/222 |
| 3,638,858 A | 2/1972 | Alms | 237/50 |
| 3,779,230 A * | 12/1973 | Mucklerath | 126/116 R |
| 3,841,828 A * | 10/1974 | Cooper | 432/222 |
| 3,844,270 A * | 10/1974 | Black | 126/110 R |
| 3,916,870 A * | 11/1975 | Beavers | 126/110 B |
| 4,011,041 A * | 3/1977 | Taylor | 432/222 |
| 4,023,923 A * | 5/1977 | Kramer, Jr. | 432/222 |
| 4,110,600 A * | 8/1978 | Spotts et al. | 126/110 AA |
| 4,140,101 A * | 2/1979 | Glover | 126/110 B |
| 4,197,447 A * | 4/1980 | Jones | 126/110 R |
| 4,244,349 A * | 1/1981 | Velie et al. | 432/222 |
| 4,278,423 A * | 7/1981 | Siccardi | 432/222 |
| 4,294,403 A * | 10/1981 | Ammons et al. | 236/13 |
| 4,296,727 A * | 10/1981 | Bryan | 126/116 A |
| 4,307,701 A * | 12/1981 | Balon et al. | 432/222 |
| 4,308,990 A * | 1/1982 | Borovina et al. | 126/110 R |
| 4,340,362 A * | 7/1982 | Chalupsky et al. | 432/222 |
| 4,369,030 A * | 1/1983 | Siccardi | 432/222 |
| 4,429,679 A * | 2/1984 | Dirkes | 126/110 A |
| 4,443,187 A * | 4/1984 | Shaftner et al. | 432/222 |
| 4,519,776 A * | 5/1985 | DeYoreo et al. | 43/132.1 |
| 4,532,914 A * | 8/1985 | Thomas et al. | 432/222 |
| 4,573,912 A * | 3/1986 | Albritton et al. | 432/222 |
| 4,609,346 A * | 9/1986 | Siccardi | 432/222 |
| 4,737,103 A * | 4/1988 | Siccardi | 432/222 |
| 4,794,908 A * | 1/1989 | Hall | 126/112 |
| 4,817,329 A * | 4/1989 | Forbes | 43/132.1 |
| 4,869,665 A * | 9/1989 | Coppin | 431/351 |
| 4,878,226 A | 10/1989 | McQuoid et al. | |
| 4,917,074 A * | 4/1990 | Brekke | 126/110 A |
| 4,953,320 A * | 9/1990 | Nelson | 43/132.1 |
| 4,958,456 A * | 9/1990 | Chaudoin et al. | 43/132.1 |
| 4,961,283 A * | 10/1990 | Forbes | 43/132.1 |
| 4,993,944 A * | 2/1991 | Potter et al. | 432/222 |
| 5,052,367 A * | 10/1991 | Beavers et al. | 126/110 B |
| 5,058,313 A * | 10/1991 | Tallon | 43/132.1 |
| 5,083,918 A * | 1/1992 | Potter et al. | 432/222 |
| 5,131,836 A * | 7/1992 | Coppin | 431/12 |
| 5,165,883 A * | 11/1992 | Van Bemmel | 431/22 |
| 5,191,874 A * | 3/1993 | McWilliams | 126/312 |
| 5,257,958 A * | 11/1993 | Jagers | 454/238 |
| 5,282,334 A * | 2/1994 | Kimura et al. | 43/125 |
| 5,349,778 A * | 9/1994 | Chu | 43/132.1 |
| 5,365,692 A * | 11/1994 | Gustafson | 43/132.1 |
| 5,378,086 A * | 1/1995 | Campbell et al. | 43/124 |
| 5,385,299 A * | 1/1995 | Zawada | 126/110 R |
| 5,460,162 A * | 10/1995 | Binzer | 126/112 |
| 5,471,782 A * | 12/1995 | Brittell | 43/132.1 |
| 5,540,211 A * | 7/1996 | Ahern | 126/110 R |
| 5,540,213 A * | 7/1996 | Shell et al. | 126/110 B |
| 5,540,273 A * | 7/1996 | Polk et al. | 431/12 |
| 5,636,786 A * | 6/1997 | Daneshvar et al. | 126/110 C |
| 5,641,463 A * | 6/1997 | Langhart | 43/124 |
| 5,647,342 A * | 7/1997 | Jamieson et al. | 126/512 |
| 5,678,352 A * | 10/1997 | Leitner et al. | 43/125 |
| 5,792,419 A * | 8/1998 | Williamson et al. | 43/124 |
| 5,865,618 A * | 2/1999 | Hiebert | 432/222 |
| 5,867,935 A * | 2/1999 | Brown | 47/1.01 R |
| 5,915,960 A * | 6/1999 | Check et al. | 126/110 C |
| 5,974,726 A * | 11/1999 | Creeger et al. | 43/132.1 |
| 6,014,966 A * | 1/2000 | Stevenson | 126/110 R |
| 6,116,232 A * | 9/2000 | Valters et al. | 126/512 |
| 6,141,901 A * | 11/2000 | Johnson et al. | 43/132.1 |
| 6,155,160 A * | 12/2000 | Hochbrueckner | 126/112 |
| 6,161,763 A * | 12/2000 | Reuter | 236/44 C |
| 6,182,453 B1 * | 2/2001 | Forsberg | 62/125 |
| 6,296,478 B1 * | 10/2001 | Gatley, Jr. | 126/104 A |
| 6,308,702 B1 * | 10/2001 | Huyghe et al. | 126/110 B |
| 6,318,358 B1 * | 11/2001 | Gatley, Jr. | 126/110 R |
| 6,327,812 B1 * | 12/2001 | Hedman et al. | 43/132.1 |
| 6,394,795 B2 * | 5/2002 | Fayerman et al. | 432/222 |
| 6,447,737 B1 * | 9/2002 | Williamson et al. | 43/124 |
| 6,526,964 B1 * | 3/2003 | Potter et al. | 432/222 |
| 6,581,324 B1 * | 6/2003 | Creeger et al. | 43/132.1 |
| 6,588,140 B1 * | 7/2003 | Johnson et al. | 43/132.1 |
| 6,594,944 B2 * | 7/2003 | Chura | 43/98 |
| 6,595,200 B1 * | 7/2003 | Dai | 126/110 B |
| 6,612,067 B2 * | 9/2003 | Topp | 43/124 |
| 6,678,994 B2 * | 1/2004 | Topp | 43/124 |
| 6,681,760 B2 * | 1/2004 | Topp | 432/222 |
| 6,718,685 B2 * | 4/2004 | Bossler | 43/107 |
| 6,772,829 B2 * | 8/2004 | Lebrun | 165/121 |
| 6,880,548 B2 * | 4/2005 | Schultz et al. | 126/110 R |
| 6,880,549 B2 * | 4/2005 | Topp | 126/110 B |
| 6,884,065 B2 * | 4/2005 | Vandrak et al. | 126/110 B |
| 6,892,491 B2 * | 5/2005 | Hedman | 43/132.1 |
| 6,921,261 B2 * | 7/2005 | Perry | 432/222 |
| 6,923,173 B2 * | 8/2005 | Schonberger, Sr. | 126/110 R |
| 6,941,677 B2 * | 9/2005 | Adrian | 126/110 B |
| 7,100,540 B2 * | 9/2006 | Vaughan | 122/40 |
| 7,134,239 B2 * | 11/2006 | Barra | 43/132.1 |
| 7,481,650 B2 * | 1/2009 | Mosiewicz et al. | 432/222 |
| 7,614,180 B2 * | 11/2009 | Durand et al. | 43/139 |
| 7,682,560 B2 * | 3/2010 | Brash | 43/125 |
| 7,690,148 B2 * | 4/2010 | Hedman | 43/132.1 |
| 7,823,579 B2 * | 11/2010 | Vandrak et al. | 432/222 |
| 7,908,791 B1 * | 3/2011 | Brash | 43/125 |
| 7,926,222 B2 * | 4/2011 | Molnar et al. | 43/132.1 |
| 7,975,657 B2 * | 7/2011 | Okayasu | 126/110 B |
| 7,997,004 B2 * | 8/2011 | Adrian | 126/110 B |
| 8,221,678 B2 * | 7/2012 | Hedman | 43/144 |
| 2001/0004813 A1 * | 6/2001 | Hedman | 43/132.1 |
| 2002/0066223 A1 * | 6/2002 | Hedman et al. | 43/124 |
| 2003/0026727 A1 * | 2/2003 | Topp | 43/124 |
| 2003/0029605 A1 | 2/2003 | Lebrun | |
| 2003/0061757 A1 | 4/2003 | Askin | |
| 2004/0028554 A1 | 2/2004 | Hedman | 422/24 |
| 2004/0035044 A1 * | 2/2004 | Topp | 43/124 |
| 2004/0154213 A1 * | 8/2004 | Mosher, II | 43/107 |
| 2004/0237382 A1 * | 12/2004 | Durand et al. | 43/139 |
| 2004/0244276 A1 * | 12/2004 | Durand et al. | 43/139 |
| 2005/0108920 A1 * | 5/2005 | Takenoshita et al. | 43/132.1 |
| 2005/0220662 A1 * | 10/2005 | Hedman | 422/1 |
| 2005/0246942 A1 * | 11/2005 | Mueller et al. | 43/124 |
| 2005/0268543 A1 * | 12/2005 | Hicks et al. | 47/1.42 |
| 2006/0010791 A1 * | 1/2006 | Topp | 422/307 |
| 2007/0023980 A1 * | 2/2007 | Abaraw | 266/252 |
| 2007/0084105 A1 * | 4/2007 | Lindsay et al. | 43/132.1 |
| 2007/0204862 A1 * | 9/2007 | Cowan | 126/85 B |
| 2007/0258853 A1 * | 11/2007 | Burton | 422/26 |
| 2008/0260364 A1 * | 10/2008 | Vandrak et al. | 392/365 |
| 2008/0302351 A1 * | 12/2008 | Hunter et al. | 126/110 B |
| 2008/0314674 A1 * | 12/2008 | Kamio | 180/282 |
| 2009/0211148 A1 * | 8/2009 | McCarty | 43/124 |
| 2010/0037512 A1 * | 2/2010 | Durand | 43/139 |
| 2010/0294257 A1 * | 11/2010 | Thayer et al. | 126/116 R |
| 2011/0108015 A1 * | 5/2011 | Jamieson | 126/116 A |
| 2011/0289825 A1 * | 12/2011 | James | 43/132.1 |
| 2011/0290228 A1 * | 12/2011 | Tsunekawa et al. | 126/116 A |
| 2011/0290229 A1 * | 12/2011 | Manning | 126/116 A |
| 2011/0308139 A1 * | 12/2011 | James | 43/132.1 |
| 2012/0102818 A1 * | 5/2012 | Rogacki et al. | 43/125 |
| 2012/0180381 A1 * | 7/2012 | DeMonte et al. | 43/144 |
| 2012/0186139 A1 * | 7/2012 | O'Brien et al. | 43/132.1 |
| 2012/0204478 A1 * | 8/2012 | Gere et al. | 43/132.1 |
| 2012/0233907 A1 * | 9/2012 | Pattison et al. | 43/124 |
| 2012/0255219 A1 * | 10/2012 | DeMonte et al. | 43/124 |
| 2012/0304528 A1 * | 12/2012 | Hosli et al. | 43/124 |
| 2012/0317870 A1 * | 12/2012 | Pratt | 43/132.1 |
| 2013/0008423 A1 * | 1/2013 | Noble et al. | 432/222 |

FOREIGN PATENT DOCUMENTS

| | | | |
|---|---|---|---|
| DE | 19746026 A1 | * | 6/1998 |
| DE | 19741722 A1 | * | 3/1999 |
| DE | 19950634 C1 | * | 5/2001 |
| DE | 10300169 A1 | * | 7/2004 |
| EP | 963694 A1 | * | 12/1999 |
| GB | 2 280 851 A | | 2/1995 |
| JP | 2009072167 A | * | 4/2009 |
| WO | WO 2009/049389 | | 4/2009 |

OTHER PUBLICATIONS

O'Brien et al., U.S. Appl. No. 13/013,560, filed Jan. 25, 2011 "Portable Heating System and Method for Pest Control".

DeMonte et al., U.S. Appl. No. 13/224,998, filed Sep. 2, 2011 "Self-Contained Heating Unit for Thermal Pest Control".

Pereira et al., "Lethal Effects of Heat and Use of Localized Heat Treatment for Control of Bed Bug Infestations," *J. Econ. Entomol.* 2009, 102(3), pp. 1182-1188, Jun. 2009.

Qarles, W., "Thermal Pest Eradication in Structures," vol. XXVIII, #5/6, May/Jun. 2006, http://www.birc.org/MayJune2006.pdf (Accessed Dec. 30, 2010).

European Patent Office Communication dated Aug. 8, 2012 regarding Application No. 11195438.4-1260, Technologies Holdings Corp.

T. R. DeMonte, U.S. Appl. No. 13/224,998, Final office action from the U.S. Patent and Trademark Office mailed Sep. 21, 2012.

European Patent Office; Communication pursuant to Article 94(3) EPC for Application No. 11 195 438.4-1655; 6 pages, Apr. 9, 2013.

* cited by examiner

SELF-CONTAINED HEATING UNIT FOR THERMAL PEST CONTROL

TECHNICAL FIELD

This disclosure relates generally to pest control and more particularly to a self-contained heating unit for thermal pest control.

BACKGROUND

It is not uncommon for pests, such as bed bugs and other insects, to infest structures or other areas that are also inhabited or otherwise used by humans. This is particularly true in enclosed spaces that are located within certain climates and/or enclosed spaces that are frequented by the public. The insects, which generally hide during the day, emerge from cracks and crevices at night to feast on human blood while the human inhabitants are asleep. For example, hotels may become infested with bed bugs or other pests when those insects are brought in by overnight guests. The problem is not isolated to hotels that service overnight visitors, however. Other spaces that may become infested include office and commercial buildings, private dwellings, and vehicles. Accordingly, the need exists for effective and efficient systems and methods for killing bed bugs and/or other pests within an enclosed area. Systems and methods for killing bed bugs and/or other pests, however, have proven inadequate in various respects.

SUMMARY

According to embodiments of the present disclosure, disadvantages and problems associated with previous systems for killing pests such as bed bugs in an affected area may be reduced or eliminated.

In certain embodiments, an apparatus for killing pests in an affected area includes a fuel source, a first air inlet configured to receive a first air flow from the affected area, and a second air inlet configured to receive a second air flow from an unaffected area. The system further includes a premix system operable to generate an air-fuel mixture by mixing a fuel flow received from the fuel source with the second air flow received from the second air inlet. The system further includes a burner operable to generate combustion air by combusting the air-fuel mixture. The combustion air is mixed with the first air flow subsequent to combustion to generate a heated air flow, and the heated air flow is discharged into the affected area. The fuel source, the premix system, and the burner are configured for positioning in the affected area.

Particular embodiments of the present disclosure may provide one or more technical advantages. For example, because the components of the system of the present disclosure may be housed in a moveable cabinet configured for positioning within an affected area being treated, the system may provide a supply of heated air from within the affected area. Accordingly, the system of the present disclosure may be more easily placed in certain affected areas (e.g., apartments in high rise apartment buildings), as compared to certain conventional heating systems (e.g., heating systems having a heat source located external to the structure such that heated air must be piped into the affected area).

As another example, the system of the present disclosure may combust an air-fuel mixture composed of fuel and a flow of air pulled from external to the affected area. As a result, the oxygen consumed during combustion of the air-fuel mixture by the burner is oxygen pulled from external to the affected area being treated, which reduces or eliminates oxygen depletion within the affected area. Additionally, in embodiments in which the second air flow includes sufficient oxygen to combust substantially all of the fuel flow received from the fuel source, complete combustion of the fuel contained in the fuel flow may be achieved by the burner. As a result, the production of carbon monoxide during the combustion process may be reduced. By reducing (1) the depletion of oxygen within the affected area, and (2) the production of carbon monoxide during the combustion process, the heating unit of the present disclosure may be used to heat affected areas having poor ventilation without the need for persons entering the affected area during the heating process to have external supplies of oxygen (e.g., oxygen masks).

Additional advantages of the system of the present disclosure include the ability to elevate the temperature of an affected area to a temperature suitable for killing bed bugs and/or other pests without causing damage to the affected area or its contents. For example, the air within the affected area may be thoroughly and uniformly heated to a temperature that is approximately 140 degrees Fahrenheit. Such a temperature has been shown to be effective in killing bed bugs and/or other pests that have infested the affected area without causing damage to the affected area or its contents. Additionally, treatment temperatures of approximately 140 degrees Fahrenheit may be tolerated by persons entering the affected area during treatment.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE DRAWINGS

Figure 1:
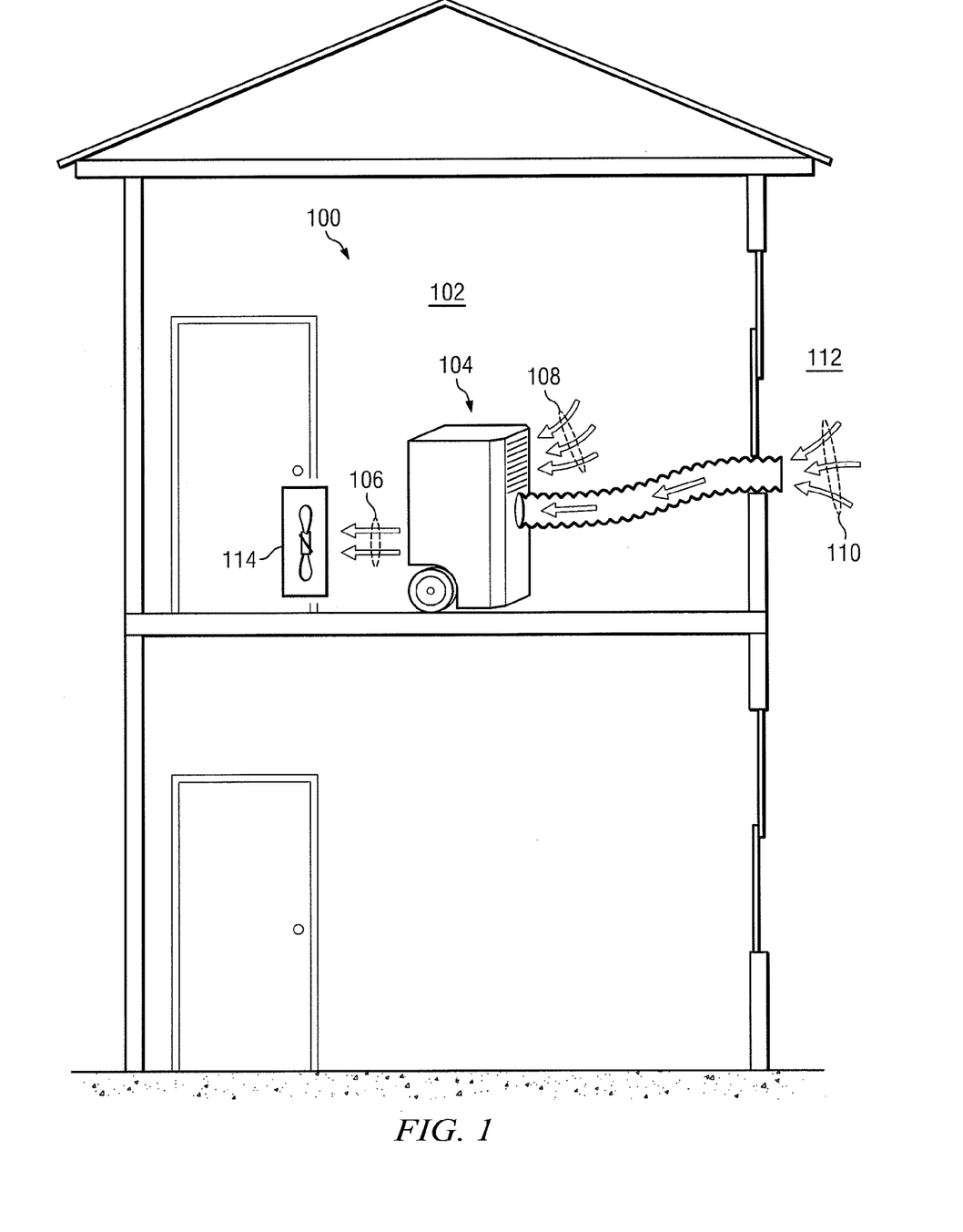
FIG. 1 illustrates an example heating system for thermal pest control within an affected area, according to certain embodiments of the present disclosure.

FIG. 1 illustrates an example heating system 100 for thermal pest control within an affected area 102, according to certain embodiments of the present disclosure. Heating system 100 may include a heating unit 104 configured to be positioned within affected area 102. Heating unit 104 is operable to discharge heated air 106 into affected area 102. Affected area 102 may include any site where bedbugs or other pests may nest, including where there has been visual confirmation of a nesting area of bedbugs or other pests, or where a trained animal (e.g., a scent detection dog) has alerted to the presence of bedbugs or other pests (i.e., an acute infestation site). In certain embodiments, affected area 102 may include all or a portion of a building or structure, such as an apartment within an apartment building, a hotel, an office space, a commercial building, a private dwelling (e.g., a house), or any other suitable enclosed space where an infestation is suspected. In certain other embodiments, affected area 102 may be located outside a building or structure, such as within an automobile, an airplane, or any other suitable enclosed space where an infestation is suspected.

Figure 2:
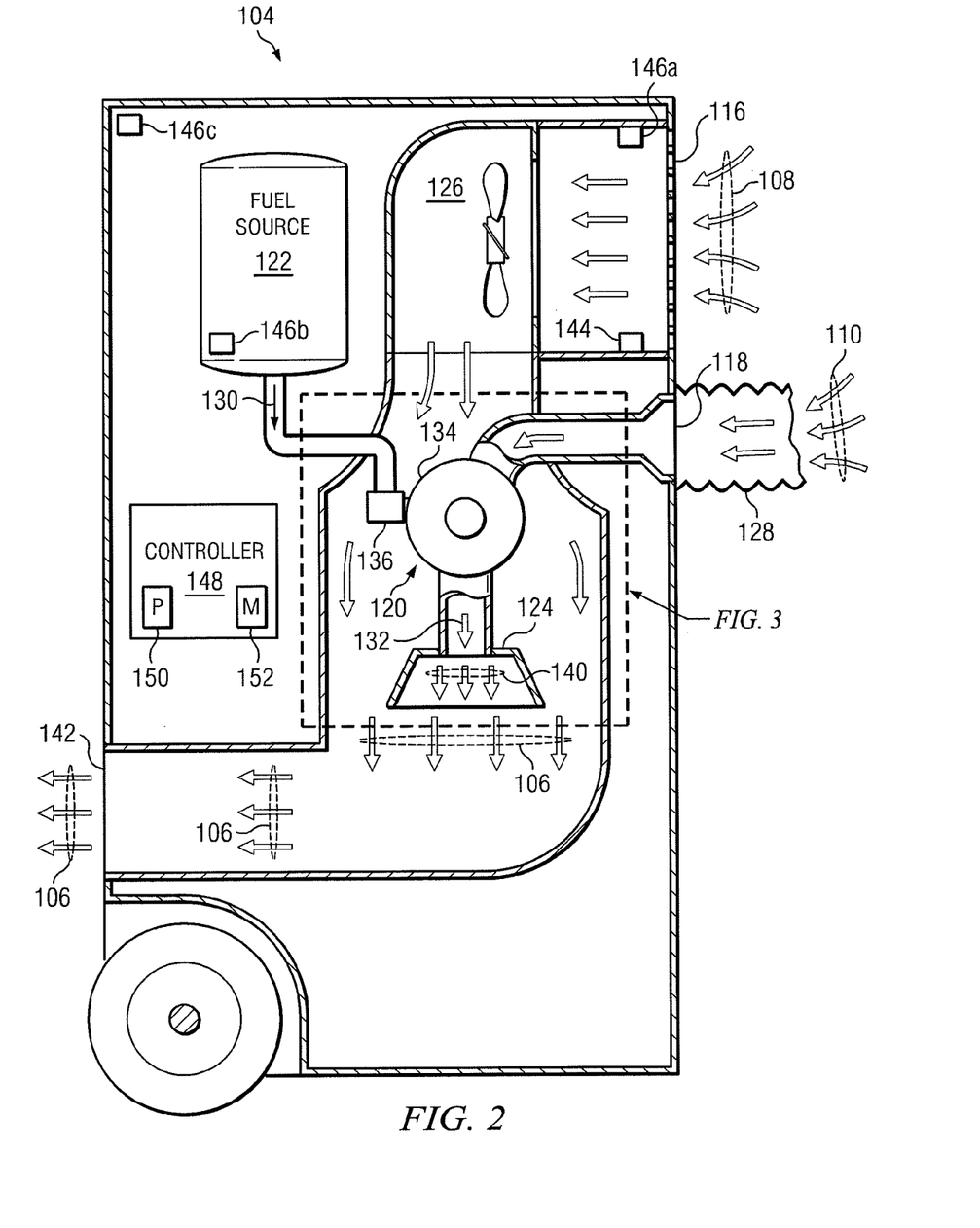
FIG. 2 illustrates a detailed view of an example heating unit for thermal pest control, according to certain embodiments of the present disclosure.
Figure 3:
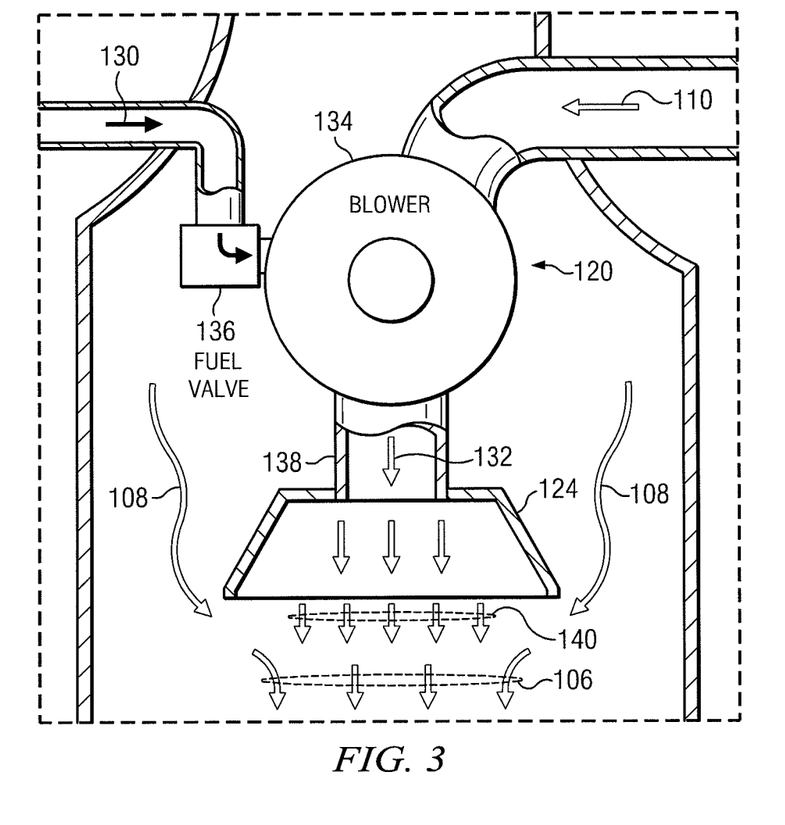
FIG. 3 illustrates a detailed view of a premix system of the example heating unit for thermal pest control depicted in FIG. 2, according to certain embodiments of the present disclosure.

In certain embodiments, heating unit 104 may generate heated air 106 by combining a first air flow 108 drawn from within affected area 102 with combustion air 140 generated by combusting, in a burner 124, an air-fuel mixture 132 consisting of a combination of a second air flow 110 drawn from external to affected area 102 (e.g., from unaffected area 112) and a fuel flow 130 from a fuel source 122 (as described in detail with regard to FIGS. 2-3). The heated air 106 discharged into affected area 102 by heating unit 104 may heat the affected area 102 and its contents to a target temperature sufficient to kill bed bugs and/or other pests that may have infested the affected area 102. For example, a temperature of approximately 120 degrees Fahrenheit may be sufficient to kill bed bugs and/or other pests. In certain embodiments, however, it may be desirable to raise the air temperature within affected area 102 to a temperature greater than 120 degrees Fahrenheit (e.g., approximately 140 degrees Fahrenheit) in order to ensure that the contents within affected area 102 are adequately and thoroughly heated to a target temperature (e.g., 120 degrees Fahrenheit).

In certain embodiments, system 100 may include one or more air movers 114 positioned within the affected area 102. Air movers 114 may distribute the heated air 106 discharged by heating unit 104 throughout affected area 102. Air movers 114 may include standard propeller type fans or any other suitable devices for producing a current of air that may be used to circulate heated air 106 and, in some embodiments, reduce the concentration of heated air 106 in a particular location, such as at or near the ceiling of affected area 102. Although FIG. 1 depicts only a single air mover 114 positioned within affected area 102, one or more additional air movers 114 may also be selectively positioned within affected area 102 to promote the circulation of heated air 106 through affected area 102, as desired. For example, air movers 114 may be positioned within affected area 102 such that a desired airflow pattern (e.g., clock-wise or counter-clockwise) is achieved.

In certain embodiments, the output side of air mover 114 may be configured to direct heated air 106 toward hard to heat areas and/or contents of affected area 102. For example, affected area 102 may include an exterior wall, the outside of which may be exposed to cold outside temperatures. As a result, the exterior wall may be harder to heat than certain other portions of affected area 102. An air mover 114 may therefore be positioned to direct heated air 106 toward the exterior wall in order to more effectively heat the exterior wall. In certain embodiments, the output side of air mover 114 may be configured to direct heated air 106 along the floor of affected area 102 to further aid in the circulation of heated air 106 and prevention of temperature stratification (as it is generally recognized that heated air 106 will rise as it exits heating unit 104). For example, the configuration of output side of air mover 114 may be such that heated air 106 is directed towards the baseboards or floor of affected area 102. In certain embodiments, the output side of air mover 114 may include a modified circle that includes on elongated corner configured to direct air in a generally downward direction. An example of such an air mover may be that sold under the name Phoenix Axial Air Mover with FOCUS™ Technology or Quest Air AMS 30 by Therma-Stor, L.L.C., which is described in U.S. Pat. No. 7,331,759 issued Marco A. Tejeda and assigned to Technologies Holdings Corp. of Houston, Tex.

Additionally, because some items or areas within affected area 102 may be considered hard to heat, additional measures may be taken to ensure thorough distribution of heat through affected area 102 and its infested contents. For example, tightly packed contents within affected area 102, which may be resistant to being heated completely throughout (e.g., contents within closets and drawers, stacked articles such as clothing or towels, etc.) may be separated such that each item may be sufficiently enveloped in the heat emitted from heating unit 104. As a result, heated air 106 may more easily penetrate such items to ensure that bed bugs and/or others pest therein are killed.

Although a particular implementation of system 100 is illustrated and primarily described, the present disclosure contemplates any suitable implementation of system 100, according to particular needs. Moreover, although various components of system 100 have been depicted as being located at particular positions within affected area 102, the present disclosure contemplates those components being positioned at any suitable location, according to particular needs.

FIG. 2 illustrates a detailed view of an example heating unit 104 for thermal pest control, according to certain embodiments of the present disclosure. Heating unit 104 may include a first air inlet 116, a second air inlet 118, a premix system 120, a fuel source 122, and a burner 124.

In certain embodiments, the components of heating unit 104 may be arranged in a moveable cabinet that may be moved into an affected area 102 in order to provide heated air 106 from within an affected area 102. As a result, heating unit 104 may be used to more easily and effectively supply heated air 106 to a wider variety of affected areas 102, as compared to certain conventional systems for heating an affected area. For example, in embodiments in which affected area 102 comprises an apartment located on an upper floor of a high rise apartment building (as depicted in FIG. 1), heating unit 104 may be positioned within the affected area 102 in order to supply heated air 106 to the affected area 102, which may be more convenient than certain conventional heating systems (e.g., heating systems having a heat source located external to the affected area 102 such that heated air must be piped into the affected area 102).

First air inlet 116 may be configured to receive first air flow 108 from inside affected area 102. In certain embodiments, first air flow 108 may be drawn through first air inlet 116 by an impeller 126. Impeller 126 may include any suitable component operable to draw first air flow 108 from affected area 102 at a particular flow rate. For example, impeller 126 may include a fan having a variable speed electric motor such that the flow rate of first air flow 108 may be varied by altering the speed of the electric motor. In certain embodiments, the speed of the electric motor of impeller 126 may be adjusted manually (e.g., by a user). In certain other embodiments, the speed of the electric motor of impeller 126 may be adjusted automatically, such as in response to a signal received from a controller 148 (described in further detail below).

Second air inlet 118 may be configured to receive second air flow 110 from outside affected area 102 (e.g., from unaffected area 112). In certain embodiments, second air flow 110 may be drawn through second air inlet 118 by a blower component 134 of premix system 120 (depicted in FIG. 3 and described in further detail below). Second air inlet 118 may be in fluid communication with unaffected area 112, such as via an air duct 128. For example, in embodiments in which affected area 102 comprises an apartment within an apartment building, second air flow 110 may be drawn from the exterior of the apartment building (i.e., unaffected area 112 may be external to the apartment building) via air duct 128 extending to the exterior of the apartment building (e.g., via a window in the apartment). As another example, in embodiments in which affected area 102 comprises an apartment within an apartment building, second air flow 110 may be drawn from the exterior of the apartment but within the apartment building (i.e., unaffected area 112 may be inside the apartment building) via air duct 128 extending, for example, to a hallway outside the apartment (e.g., via a doorway in the apartment).

Premix system 120 may be operable to combine second air flow 110 with a fuel flow 130 from fuel source 122 to generate a combustible air-fuel mixture 132. Fuel source 122 may include any suitable source of a fuel flow 130 that, when combined with second air flow 110 (as described below), forms a combustible air-fuel mixture 132. For example, fuel source 122 may include a container housing propane gas (e.g., a commonly-available twenty-pound portable propane tank) such that fuel source 122 is capable of supplying a flow of propone gas to premix system 120. As another example, fuel source 122 may include a container housing MAPP™ gas (e.g., a commonly-available twenty-pound portable MAPP™ gas tank) such that fuel source 122 is capable of supplying a flow of MAPP™ gas to premix system 120.

As illustrated in FIG. 3, premix system 120 may include a blower 134 operable to draw second air flow 110 from unaffected area 112, a fuel valve 136 operable to regulate the fuel flow 130 from fuel source 122, and a mixing chamber 138 (e.g., positioned between blower 134/fuel valve 136 and burner 124) in which second air flow 110 and fuel flow 130 mix together to form air-fuel mixture 132. Although depicted and primarily described as having particular components, the present disclosure contemplates premix system 120 including any materials/structure facilitating the mixture of second airflow 110 and fuel flow 130 to generate a combustible air-fuel mixture 132.

Blower 134 of premix system 120 may include any suitable component operable to draw second air flow 110 from unaffected area 112 at a particular flow rate. For example, blower 134 may include a fan (not shown) having a variable speed electric motor such that the flow rate of second air flow 110 may be varied by altering the speed of the electric motor. In certain embodiments, the speed of the electric motor of blower 134 may be adjusted manually (e.g., by a user). In certain other embodiments, the speed of the electric motor of blower 134 may be adjusted in response to a signal received from a controller 148 (described in further detail below).

Fuel valve 136 of premix system 120 may include any suitable valve component operable to regulate a fuel flow 130 from fuel source 122 to premix system 120. For example, fuel valve 136 may include a valve operable to provide a range of flow rates such that the flow rate of fuel flow 130 from fuel source 122 may be varied by altering the degree to which the variable flow valve 136 is open or closed. In certain embodiments, the degree to which the fuel valve 136 is open or closed may be adjusted manually (e.g., by a user). In certain other embodiments, the degree to which the fuel valve 136 is open or closed may be adjusted in response to a signal received from a controller 148 (described in further detail below). In certain embodiments, fuel flow 130 may be regulated using fuel valve 136 such that fuel having between 10,000 BTUs of energy and 40,000 BTUs of energy is provided to premix system 120 (and subsequently combusted by burner 124, as described in detail below). As just one example, fuel flow 130 may be regulated such that fuel having approximately 30,000 BTUs of energy is provided to premix system 120.

Burner 124 may include any suitable component operable to combust air-fuel mixture 132 received from premix system 120 in order to generate combustion air 140. As a particular example, burner 124 may include a five-sided, sealed burner box that provides an isolated combustion environment. Additionally, burner 124 may include a metal fiber matrix flame surface that provides a large surface area across which air-fuel mixture 132 may combust to generate combustion air 140. The combustion air 140 exiting burner 124 may be mixed with first air flow 108 to generate heated air 106, which may be discharged into affected area 102 via an air outlet 142.

In certain embodiments, the flow rates of second air flow 110 and fuel flow 130 may be cooperatively controlled using premix system 120 (e.g., by controlling blower 134 and fuel valve 136, as discussed above) such that the air-fuel mixture 132 supplied to burner 124 includes an amount of oxygen (from second air flow 110) sufficient to combust substantially all of the fuel contained in fuel flow 130. As a result, in certain embodiments of heating unit 104, combustion air 140 exiting burner 124, as well as heated air 106 being discharged into affected area 102, may be substantially free of excess carbon monoxide gas. Moreover, because second air flow 110 is drawn from external to affected area 102, the oxygen consumed by the combustion process of burner 124 may not deplete oxygen levels in the air within affected area 102.

As just one example of the above-discussed cooperative control, the flow rate of second air flow 110 may be adjusted (e.g., by adjusting the fan speed of blower 134, as described above) such that second air flow 110 contains an amount of oxygen sufficient to combust substantially all of the fuel of a fuel flow 130 having a flow rate selected (e.g., by a user or by controller 148) to provide a particular amount of energy (e.g., 30,000 BTUs). As discussed above, the fan speed of blower 134 may be either adjusted manually (e.g., by a user) or automatically (e.g., by controller 148, as described below) in response to the amount of energy contained in fuel flow 130.

Referring back to FIG. 2, in certain embodiments, heating unit 104 may additionally include a thermostat 144. Thermostat 144 may be operable to measure the air temperature within affected area 102 (e.g., by measuring the temperature of first air flow 108 passing through first air inlet 116) such that one or more components of heating unit 104 (e.g., impeller 126, blower 134, fuel valve 136, and/or burner 124) may be selectively controlled in response to the air temperature. For example, thermostat 144 may be operable to stop the supply of heated air 106 to affected area 102 (e.g., by turning off one or more components of heating unit 104) when the air temperature within affected area 102 exceeds an upper limit (e.g., 145 degrees Fahrenheit). Additionally, thermostat 144 may be operable to resume the supply of heated air 106 to affected area 102 (e.g., by turning on one or more components of heating unit 104) when the air temperature within affected area 102 drops below a lower limit (145 degrees Fahrenheit). As a result, thermostat 144 may serve to maintain the air temperature within affected area 102 at or above a target temperature suitable for killing bed bugs and/or other pests.

In certain embodiments, heating unit 104 may additionally include one or more safety sensors 146. For example, safety sensors 146 may include an air monitoring sensor 146a, a fuel source temperature monitoring sensor 146b, and a tip sensor 146c. Although particular safety sensors are depicted and primarily described, the present disclosure contemplates heating unit 104 including any suitable number and combination of safety sensors, according to particular needs.

Air monitoring sensor 146a may be operable to measure one or more characteristics of the air within affected area 102 (e.g., by sampling first air flow 108 passing through first air inlet 116) such that heating unit 104 may be shut down if a dangerous condition is detected. For example, air monitoring sensor 146a may be operable to measure the oxygen level of air within affected area 102 such that heating unit 102 may be shut down in the event that the oxygen level is below a minimum safe level (e.g., a level below which the air is not suitable for breathing). As another example, air monitoring sensor 146a may be operable to measure the carbon monoxide level of air within affected area 102 such that heating unit 102 may be shut down in the event that the carbon monoxide level exceeds a maximum safe level (e.g., a level above which the air is not suitable for breathing). As yet another example, air monitoring sensor 146a may be operable to measure the carbon dioxide level of air within affected area 102 such that heating unit 102 may be shut down in the event that the carbon dioxide level exceeds a maximum safe level (e.g., a level above which the air is not suitable for breathing). Although air monitoring sensor 146a is depicted and primarily described as a single sensor operable to monitor certain characteristics of air within affected area 102, the present disclosure contemplates any suitable number of sensors operable to monitor any suitable characteristics of air within affected area 102, according to particular needs.

Fuel source temperature monitoring sensor 146b may be operable to measure the temperature of fuel source 122 such that heating unit 104 may be shut down if a dangerous condition is detected. For example, fuel source temperature monitoring sensor 146b may be operable to shut down heating unit 104 if the temperature of fuel source 122 exceeds a maximum safe level (e.g., a level at which the pressure of the fuel within fuel source 122 exceeds the pressure rating of the container housing the fuel).

Tip sensor 146c may be operable to measure the orientation of heating unit 104 such that heating unit 104 may be shut down if a dangerous condition is detected. For example, tip sensor 146c may be operable to shut down heating unit 104 if the orientation of heating unit 104 deviates more from a predefined range of safe operating orientations (e.g., an orientation at which heating unit 104 is in danger of "tipping over").

In certain embodiments, the above discussed safety sensors 146 may "shut down" heating unit 104 by initiating the shutting down of one or more components of heating unit 104 (e.g., by stopping impeller 126, stopping blower 134, closing fuel valve 136, and/or turning off burner 124). In certain embodiments, safety sensors 146 initiate the shutting down of one or more components of heating unit 104 by communicating signal(s) to a controller 148 (described below), which may communicate signals to the one or more components, thereby causing the one or more components to shut down.

In certain embodiments, one or more of the above-discussed components of heating unit 104 (e.g., impeller 126, blower 134, fuel valve 136, burner 124, thermostat 144, and/or safety sensors 146) may be communicatively coupled (e.g., via wireless or wireline communication) to controller 148, which may control certain aspects of the above-discussed operation of those components. Controller 148 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, controller 148 may include any suitable combination of software, firmware, and hardware.

Controller 148 may additionally include one or more processing modules 150. Processing modules 150 may each include one or more microprocessors, controllers, or any other suitable computing devices or resources and may work, either alone or with other components of heating unit 104, to provide a portion or all of the functionality of system 100 described herein. Controller 148 may additionally include (or be communicatively coupled to via wireless or wireline communication) memory 152. Memory 152 may include any memory or database module and may take the form of volatile or non-volatile memory, including, without limitation, magnetic media, optical media, random access memory (RAM), read-only memory (ROM), removable media, or any other suitable local or remote memory component.

For example, controller 148 may be configured to receive a signal from fuel valve 136, the signal indicating the flow rate of fuel flow 130 (and thus indicating the amount of energy contained in fuel flow 130). In response to the signal from fuel valve 136, controller 148 may communicate a signal to blower 134, the signal causing blower 134 to operate at a speed such that second air flow 110 contains an amount of oxygen sufficient to combust substantially all of the fuel of fuel flow 130. Alternatively, controller 148 may receive a signal from blower 134, the signal indicating the flow rate of second air flow 110. In response to the signal from blower 134, controller 148 may communicate a signal to fuel valve 136, the signal causing fuel valve 136 to permit a fuel flow 130 having an amount of fuel corresponding to the amount of oxygen of second air flow 110. In other words, controller 148 may cooperatively control blower 134 and fuel valve 136 such that premix system 120 generates an air-fuel mixture 132 having an appropriate oxygen-fuel ratio.

As another example, controller 148 may be configured to receive a signal from thermostat 144, the signal indicating the temperature within affected area 102. Controller 148 may determine (e.g., using any suitable logic) whether the temperature of air within affected area 102 exceeds an upper limit (e.g., stored in memory module 152). If so, controller 148 may communicate signals to one or more components of heating unit 104 (e.g., impeller 126, blower 134, fuel valve 136, and/or burner 124), the signals causing the one or more components to turn off in order to stop the flow of heated air 106 into affected area 102. Controller 148 may additionally determine (e.g., using any suitable logic) whether the temperature of air within affected area 102 falls below a lower limit (e.g., stored in memory module 140). If so, controller 148 may communicate signals to one or more components of heating unit 104 (e.g., impeller 126, blower 134, fuel valve 136, and/or burner 124), the signals causing the one or more components to turn on in order to resume the flow of heated air 106 into affected area 102.

As yet another example, controller 148 may be configured to receive signals from one or more of safety sensors 146, the signal(s) indicating whether the safety sensor(s) 146 detect an unsafe condition. For example, a signal from air monitoring sensor 146a indicating an unsafe condition may be a signal indicating that air within affected area 102 has (1) an oxygen level below a minimum level, (2) a carbon monoxide level exceeding a maximum safe level, or (3) a carbon monoxide level exceeding a maximum safe level. As another example, a signal from fuel source temperature monitoring sensor 146b indicating an unsafe condition may be a signal indicating that the temperature of fuel source 122 exceeds a maximum safe temperature. As yet another example, a signal from tip sensor 146c indicating an unsafe condition may be a signal indicating that the orientation of heating unit 104 is outside a range or safe operating orientations. In response to a signal indicating an unsafe condition, controller 148 may communicate signals to one or more components of heating unit 104 (e.g., impeller 126, blower 134, fuel valve 136, and/or burner 124), the signals causing the one or more components to turn off in order to stop operation of heating unit 104.

In operation of an example embodiment of heating unit 104, heating unit 104 may receive first air flow 108 via a first air inlet 116, first air flow 108 being drawn from within affected area 102. Heating unit 104 may additionally receive second air flow 110 via second air inlet 118, second air flow 110 being drawn from external to affected area 102 (i.e., from unaffected area 112) via an air duct 128. Second air flow 110 is combined with fuel flow 130 (e.g., in a mixing chamber 138 of premix system 120) to generate an air-fuel mixture 132. Air fuel mixture 132 is combusted by burner 124 to generate combustion air 140. Combustion air 140 exiting burner 124 is mixed with first air flow 108 to generate heated air 106. Heated air 106 is discharged into affected area 102 via air outlet 142. The discharged heated air 106 may heat the affected area to a target temperature sufficient to kill bed bugs and/or other pests.

Although a particular implementation of heating unit 104 is illustrated and primarily described, the present disclosure contemplates any suitable implementation of heating unit 104, according to particular needs. Moreover, although various components of heating unit 104 have been depicted as being located at particular positions within the moveable cabinet and relative to one another, the present disclosure contemplates those components being positioned at any suitable location, according to particular needs.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A method for killing pests, comprising:
   positioning a heating unit in an affected area, the heating unit comprising:
   a fuel source, the fuel source comprising a fuel tank;
   a first air inlet configured to receive a first air flow from an affected area;
   a second air inlet configured to receive a second air flow from an unaffected area;
   a premix system operable to generate an air-fuel mixture by mixing a fuel flow received from the fuel source with the second air flow received from the second air inlet;
   a burner operable to generate combustion air by combusting the air-fuel mixture; and
   a thermostat positioned in the first air inlet, the thermostat operable to measure an air temperature at the first inlet; and
   a controller configured to communicate with the thermostat;
   wherein the fuel tank, the premix system, the burner, the thermostat, and the controller are housed in a moveable cabinet;
   orienting the heating unit in the affected area such that the first air inlet of the heating unit may receive the first air flow from the affected area;
   connecting a first end of an air duct to the second air inlet of the heating unit;
   positioning a second end of the air duct outside the affected area such that the second air inlet may receive the second air flow from outside the affected area;
   connecting the fuel source to the heating unit, the fuel source providing the fuel flow to the heating unit, the heating unit configured to:
   mix the fuel flow with the second air flow via the premix system to generate an air-fuel mixture;
   combust the air-fuel mixture via the burner to generate combustion air;
   mix the combustion air with the first air flow subsequent to combustion to generate a heated air flow; and
   discharge the heated air flow into the affected area; and
   measuring the air temperature at the first air inlet using the thermostat positioned in the first air inlet; and
   controlling the discharge of the heated air flow into the affected area with the controller, based on the measured air temperature at the first air inlet, such that the affected area is heated to a target temperature.

2. The method of claim 1, wherein the target temperature is greater than or equal to 120 degrees Fahrenheit.

3. The method of claim 1, wherein the affected area comprises a dwelling located in a building at above ground level.

4. The method of claim 1, wherein:
   the fuel tank comprises a propane tank; and
   the fuel flow comprises a flow of propane gas.

5. The method of claim 4, wherein the flow of propane gas comprises between 10,000 and 40,000 BTUs of energy.

6. The method of claim 1, wherein the second air flow is drawn into the second air inlet at a flow rate sufficient to combust at least a portion of the fuel flow provided by the fuel source.

7. The method of claim 6, wherein the one or more air movers are operable to distribute at least a portion of the heated air flow discharged by the heating unit along a floor of the affected area.

8. The method of claim 1, wherein the second air flow is drawn into the second air inlet at a flow rate sufficient to combust substantially all of the fuel flow provided by the fuel source.

9. The method of claim 1, further comprising positioning one or more air movers adjacent to the heating unit, the one or more air movers operable to distribute at least a portion of the heated air flow discharged by the heating unit within the affected area.

10. The method of claim 1, further comprising separating a plurality of contaminated items within the affected area to ensure that each of the plurality of contaminated items is heated throughout to the target temperature.

11. The method of claim 1, further comprising individually handling and exposing a contaminated item to the heated air flow within the affected area to ensure that the contaminated item is heated throughout to the target temperature.

* * * * *